(12) United States Patent
Tanaka et al.

(10) Patent No.: US 11,541,335 B2
(45) Date of Patent: Jan. 3, 2023

(54) CHEMICAL LIQUID PURIFICATION APPARATUS AND PURIFICATION METHOD USING THE SAME

(71) Applicant: FUJIFILM Electronic Materials Taiwan Co., Ltd., Hsin-Chu County (TW)

(72) Inventors: Kenichi Tanaka, HsinChu County (TW); Cheng-Chieh Fan, HsinChu County (TW); Shen-Ping Huang, HsinChu County (TW)

(73) Assignee: FUJIFILM Electronic Materials Taiwan Co., Ltd., Hsin-Chu County (TW)

( * ) Notice: Subject to any disclaimer, the term of this patent is extended or adjusted under 35 U.S.C. 154(b) by 100 days.

(21) Appl. No.: 16/885,245

(22) Filed: May 27, 2020

(65) Prior Publication Data

US 2020/0376419 A1 Dec. 3, 2020

(30) Foreign Application Priority Data

May 29, 2019 (TW) ................. 108118567

(51) Int. Cl.
*B01D 36/02* (2006.01)
*B01D 35/027* (2006.01)
(Continued)

(52) U.S. Cl.
CPC ........... *B01D 35/027* (2013.01); *B01D 29/56* (2013.01); *B01D 36/02* (2013.01); *B01D 61/027* (2013.01);
(Continued)

(58) Field of Classification Search
CPC ...... B01D 35/027; B01D 29/56; B01D 36/02; B01D 61/027; B01D 2201/202;
(Continued)

(56) References Cited

U.S. PATENT DOCUMENTS

| 4,390,286 A | 6/1983 | Regaldo |
| 2010/0101984 A1 | 4/2010 | Roesgen et al. |

(Continued)

FOREIGN PATENT DOCUMENTS

| CN | 102908888 | 2/2013 |
| CN | 203469662 | 3/2014 |

(Continued)

OTHER PUBLICATIONS

Office Action of Japan Counterpart Application, with English translation thereof, dated May 11, 2021, pp. 1-6.

(Continued)

*Primary Examiner* — Waqaas Ali
(74) *Attorney, Agent, or Firm* — JCIPRNET

(57) ABSTRACT

A chemical liquid purification apparatus includes a tank body, a return tube, a liquid sending pump, a filtration device and a piping. The tank body has a liquid passage port and a circulation port communicated to a storage space inside the tank body. The return tube has one end connected to the circulation port and another end extending to the storage space. The liquid sending pump and the filtration device are located outside the tank body in between the liquid passage port and the circulation port. The piping is connecting the liquid sending pump and the filtration device to the liquid passage port and the circulation port.

5 Claims, 3 Drawing Sheets

(51) Int. Cl.
　　 B01D 29/56 (2006.01)
　　 B01D 61/02 (2006.01)
(52) U.S. Cl.
　　 CPC .. *B01D 2201/202* (2013.01); *B01D 2201/265* (2013.01); *B01D 2221/14* (2013.01); *B01D 2325/02* (2013.01)
(58) Field of Classification Search
　　 CPC .......... B01D 2201/265; B01D 2221/14; B01D 2325/02; B01D 61/14; B01D 61/58; B01D 2313/50; B01D 2315/08; B01D 2317/025; B01D 2317/08; B01D 71/36; B01D 36/00; B01D 36/003; B01D 36/006; B01D 61/00; B01D 63/00; B01D 71/32; H01L 21/67011
　　 See application file for complete search history.

(56) References Cited

U.S. PATENT DOCUMENTS

| | | | |
|---|---|---|---|
| 2016/0376095 A1* | 12/2016 | Tanaka | B60P 3/225 137/351 |
| 2019/0060782 A1 | 2/2019 | Shimizu et al. | |
| 2019/0339619 A1 | 11/2019 | Kamimura | |
| 2020/0023288 A1 | 1/2020 | Kamimura | |

FOREIGN PATENT DOCUMENTS

| | | | | |
|---|---|---|---|---|
| CN | 106275903 | | 1/2017 | |
| FR | 2945080 | | 11/2010 | |
| JP | 3080865 | B2 * | 8/2000 | |
| JP | 2001205019 | | 7/2001 | |
| JP | 2002035517 | | 2/2002 | |
| JP | 2002062667 | | 2/2002 | |
| JP | 2016073922 | | 5/2016 | |
| JP | 2017013900 | | 1/2017 | |
| TW | I606972 | | 12/2017 | |
| WO | WO-2015086773 A1 * | 6/2015 | ........... B01D 61/142 |
| WO | WO-2015168801 A1 * | 11/2015 | ........... B01D 61/145 |
| WO | 2017188209 | | 11/2017 | |
| WO | 2018043697 | | 3/2018 | |
| WO | 2018051716 | | 3/2018 | |
| WO | WO-2018084302 A1 * | 5/2018 | ........... G03F 7/0758 |
| WO | 2018142888 | | 8/2018 | |
| WO | 2018180735 | | 10/2018 | |

OTHER PUBLICATIONS

Office Action of China Counterpart Application, with English translation thereof, dated Aug. 2, 2021, pp. 1-13.
"Office Action of China Counterpart Application" with English translation thereof, dated Nov. 16, 2021, p. 1-p. 11.
"Office Action of Korea Counterpart Application" with English translation thereof, dated Dec. 16, 2021, p. 1-p. 8.
"Office Action of Japan Counterpart Application" with English translation thereof, dated Jan. 11, 2022, p. 1-p. 6.

* cited by examiner

CHEMICAL LIQUID PURIFICATION APPARATUS AND PURIFICATION METHOD USING THE SAME

BACKGROUND

Technical Field

The invention generally relates to a purification apparatus, and more particularly, to a chemical liquid purification apparatus and a method of using the same.

Description of Related Art

The semiconductor industry has achieved rapid improvements in integration density of electronic components, which are derived from continuous reductions in the component size. Ultimately, more of the smaller components are afforded to be integrated into a given area. These improvements are mostly due to the development of new precision and high resolution processing techniques.

During the manufacturing of high resolution integrated circuits, various processing liquids will come into contact with a bare wafer or a film-coated wafer. For example, the fabrication of a fine metal interconnection typically involves a procedure of coating a base material with a pre-wetting liquid before the base material is coated with a composite liquid to form a resist film. Thereafter, a developer solution and/or rinse solution are applied to form a resist pattern. These processing liquids, containing propriety ingredients and various additives, are known to be a source of contamination of the IC wafer.

One can speculate that even if trace amounts of contaminants is mixed into these chemical liquids, such as a wafer pre-wetting liquid or a developer solution, the resulting circuit patterns may have defects. It is known that the presence of very low levels of metal impurities, as low as 1.0 ppt (parts-per-trillion), interferes with the performance and stability of semiconductor devices. Furthermore, depending on the kind of metallic contaminants, oxide property may deteriorate, inaccurate patterns are formed, electrical performance of semiconductor circuits is impaired, which eventually may adversely impact the manufacturing yields.

The contamination of impurities, such as metal impurities, coarse particles, metallic particles, organic impurities, moisture, and the like, may be inadvertently introduced in a chemical liquid during various stages of the manufacturing of the chemical liquid. Examples of such include a case where impurities are presented in a raw material, or originated from a container equipment, reaction vessels, or the like used in transporting, storing, or reaction of the raw material or the chemical liquid, or a by-product generated or an unreacted reactant remained when the chemical liquid is manufactured.

Therefore, in order to form highly precise and ultra-fine semiconductor electronic circuits, chemical liquids used in the various stages of semiconductor processing, such as pre-wetting liquid, a resist solution, a developer solution, a stripping solution, a rinsing solution, and a coating solution, etc., necessitate significant quality improvement and must maintain rigorous quality control to avoid incurring defects on the resulting circuit patterns.

Conventionally, these advanced solvents (processing liquids or chemical liquids) are processed through filtration circulation several times to obtain low particle counts before they are filled into finished goods packages such as a lorry. This is generally achieved through a batch circulation method, whereby solvents are charged into a mixing tank and processed through filtration circulation for particle reduction. However, the batch circulation method suffers from many drawbacks such as the manufacture throughput time and the facility investigation costs. For example, the manufacture throughput time would be increased by the need of a solvent charging process into the mixing tank and another solvent filling process for filling the purified solvent/liquid into the finished goods package. On the other hand, the facility investigation cost is also increased by using the mixing tank.

Accordingly, there is a need to improve the purification method so that high quality (low particle) chemical liquids can be obtained, while the manufacture throughput time and facility investigation costs are reduced.

SUMMARY

The present disclosure is directed to a purification apparatus, whereby filtration circulation can be performed in the purification apparatus. As such, the solvent charging process and solvent filling process required in the conventional method can be simplified, and the manufacture throughput time can be improved.

According to one embodiment of the present disclosure, a chemical liquid purification apparatus including a tank body, a return tube, a liquid sending pump, a filtration device and a piping is provided. The tank body has a liquid passage port and a circulation port communicated to a storage space inside the tank body. One end of the return tube is connected to the circulation port and another end of the return tube is extending to the storage space. The liquid sending pump and the filtration device are located outside the tank body in between the liquid passage port and the circulation port. The piping is connecting the liquid sending pump and the filtration device to the liquid passage port and the circulation port.

In some embodiments, the chemical liquid purification apparatus further includes an extraction tube having one end connected to the liquid passage port and another end extending to the bottom of the storage space.

In some embodiments, a liquid contacting surface of the return tube and the extraction tube are made of fluororesin.

In some embodiments, the filtration device includes at least a first filter and a second filter, the first filter is located in between the second filter and the liquid passage port, and the second filter is located in between the first filter and the circulation port.

In some embodiments, the first filter and the second filter have pore sizes of 100 nm or less.

In some embodiments, the pore size of the first filter is R1 and the pore size of the second filter is R2, and R1≥R2.

In some embodiments, the pore size of the first filter is R1 and the pore size of the second filter is R2, and R1>R2.

In some embodiments, the first filter and the second filter are made of fluororesin.

In some embodiments, the first filter and the second filter are made of different materials.

In some embodiments, a liquid contacting surface of the tank body is made of fluororesin.

In some embodiments, the liquid sending pump is a non-volumetric type pump selected from the group consisting of a centrifugal pump, a mixed flow pump and an axial flow pump.

In some embodiments, the liquid sending pump is a centrifugal pump.

In some embodiments, a liquid contacting surface of the piping is electrolytic polished stainless steel.

In some embodiments, the tank body is a movable type tank body.

In some embodiments, the tank body is a tank body of a lorry.

In some embodiments, a ratio of a length of the return tube to a height of the tank body is in a range of 1:10 to 2:10.

In some embodiments, the tank body further includes a manhole and an air hole located on the top of the tank body.

In some embodiments, the chemical liquid purification apparatus further includes a support and a wheel set mounted at the bottom of the tank body, respectively being close to a front end and the rear end of the tank body, and configured to collaboratively support the tank body on the ground.

According to some other embodiments of the present disclosure, a purification method using the chemical liquid purification apparatus is described. The method includes purifying a chemical liquid in the tank body by extracting the chemical liquid from inside the storage space through the liquid passage port, and passing the chemical liquid through the liquid sending pump and the filtration device via the piping, and returning the filtered chemical liquid back to the storage space through the return tube.

In some embodiments, the tank body is purged with nitrogen through an air hole, and the chemical liquid is purified while applying positive pressure.

In view of the above, the chemical liquid purification apparatus of the present disclosure is configured with a liquid sending pump and a filtration device located in between the liquid passage port and the circulation port. Therefore, high quality (low particle) chemical liquids can be obtained, while the manufacture throughput time and facility investigation costs are reduced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The following disclosure provides different embodiments or examples, for implementing various features of the current subject matter. Specific examples of components and arrangements are described below to simplify the present disclosure. These are merely examples and are not intended to be limiting. For example, when the term "solvent(s)" is used, unless otherwise noted, it may refer to a single solvent or a combination of two or more solvents.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, a numerical range indicated by using a term "to" means a range which includes numerical values described before and after the term of "to", as a lower limit value and an upper limit value.

In the present disclosure, "ppm" means "parts-per-million $(10^{-6})$", "ppb" means "parts-per-billion $(10^{-9})$" and "ppt" means "parts-per-trillion $(10^{-12})$".

In the present disclosure, 1 Å (angstrom) corresponds to 0.1 nm (nanometer) and 1 μm (micron) corresponds to 1000 nm.

<Processing Target>

Prior to being subjected to a purification process, a liquid material or chemical liquid of the present disclosure may contain an undesirable amount of impurities and contaminants. A pre-purified chemical liquid is referred herein in the present disclosure as "processing target" or "processing target material". After the processing target is being processed by the chemical liquid purification apparatus of the present disclosure, substantial amounts of contaminants and impurities are removed from the processing target, and a liquid material/chemical liquid is produced with impurities and contaminants managed and limited within predetermined ranges.

<Liquid Material/Chemical Liquid>

Figure 1:
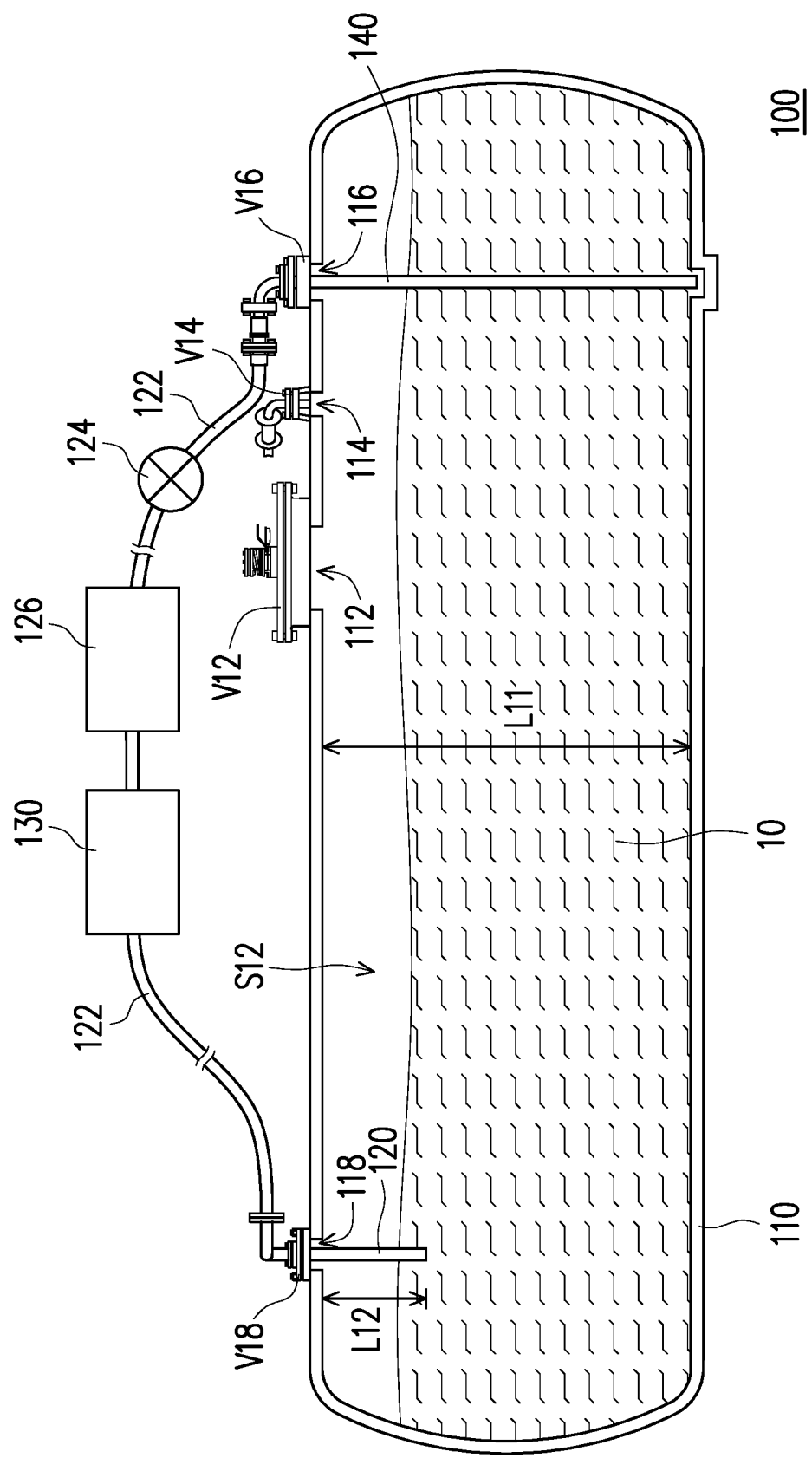
FIG. 1 is a cross-sectional view of a chemical liquid purification apparatus according to an embodiment of the invention.

FIG. 1 is a cross-sectional view of a chemical liquid purification apparatus according to an embodiment of the invention. In the exemplary embodiment, the chemical liquid purification apparatus 100 is used for manufacturing or purifying a liquid material 10 or chemical liquid. In the present disclosure, the liquid material 10 (chemical liquid) includes an organic solvent and a predetermined amount of impurities. For example, the liquid material 10 (chemical liquid) may be a processing solution that is used as at least one of the pre-wetting liquid and a developer in a manufacturing method of a semiconductor chip. Alternatively, the liquid material 10 may be used as a rinsing liquid, a cleaning liquid, a stripping liquid and the like, and a raw component used for the synthesis of the processing solution, or be used as a solvent in a composite for forming a resist film. In some other embodiments, the liquid material 10 may be any other chemical liquids used in various stages of semiconductor processing. The disclosure is not limited thereto.

In some embodiments, the liquid material 10 may be obtained by purifying organic solvents, whereby organic solvents in which particles containing metal atoms, metal ion components, and organic impurities are substantially not included or the amount thereof is sufficiently reduced can be used. In other words, the chemical liquid purification apparatus 100 removes the metal impurities, organic impurities, water, and the like in the processing target (chemical liquid/solvents).

<Organic Solvent>

In the present disclosure, the liquid material 10 (chemical liquid) includes the organic solvent. The type of organic solvent is not particularly limited, but well-known organic solvents are applicable. The content of the organic solvent in the liquid material 10 is not particularly limited, but the organic solvent is included as the main component. Specifically, the content of the organic solvent is equal to or greater than 98 mass % with respect to the total mass of the liquid material 10. In certain embodiments, the content of the organic solvent is equal to or greater than 99 mass % with respect to the total mass of the liquid material 10. In other embodiments, the content of the organic solvent is equal to or greater than 99.5 mass % with respect to the total mass of the liquid material 10. In yet another embodiment, the content of the organic solvent is equal to or greater than 99.8 mass % with respect to the total mass of the liquid material 10. The upper limit value thereof is not particularly limited, but it is in general that the upper limit value thereof is equal to or smaller than 99.99 mass %.

The organic solvent may be singly used or may be used in combination of two kinds or more thereof. In a case where a combination of two kinds or more of organic solvents is used, it is preferable that the total content thereof is in the above range The content of the organic solvent in the chemical liquid can be measured by using a gas chromatography mass spectrometry (GCMS) device.

The boiling point of the organic solvent is not particularly limited. However, the boiling point of the organic solvent is preferably lower than 200° C. from a point of improving manufacturing yield of a semiconductor chip. In this disclosure, the boiling point means a boiling point at 1 atm.

The organic solvent is not particularly limited. Examples of the organic solvent include methanol, ethanol, 1-propanol, isopropanol, n-propanol, 2-methyl-1-propanol, n-butanol, 2-butanol, tert-butanol, 1-pentanol, 2-pentanol, 3-pentanol, n-hexanol, cyclohexanol, 2-methyl-2-butanol, 3-methyl-2-butanol, 2-methyl-1-butanol, 3-methyl-1-butanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 2-ethyl-1-butanol, 2,2-dimethyl-3-pentanol, 2,3-dimethyl-3-pentanol, 2,4-dimethyl-3-pentanol, 4,4-dimethyl-2-pentanol, 3-ethyl-3-heptanol, 1-heptanol, 2-heptanol, 3-heptanol, 2-methyl-2-hexanol, 2-methyl-3-hexanol, 5-methyl-1-hexanol, 5-methyl-2-hexanol, 2-ethyl-1-hexanol, methyl cyclohexanol, trimethyl cyclohexanol, 4-methyl-3-heptanol, 6-methyl-2-heptanol, 1-octanol, 2-octanol, 3-octanol, 2-propyl-1-pentanol, 2,6-dimethyl-4-heptanol, 2-nonanol, 3,7-dimethyl-3-octanol, ethylene glycol, propylene glycol, diethyl ether, dipropyl ether, diisopropyl ether, butyl methyl ether, butyl ethyl ether, butyl propyl ether, dibutyl ether, diisobutyl ether, tert-butyl methyl ether, tert-butyl ethyl ether, tert-butyl propyl ether, di-tert-butyl ether, dipentyl ether, diisoamyl ether, cyclopentyl methyl ether, cyclohexyl methyl ether, bromomethyl methyl ether, α-dichloromethyl methyl ether, chloromethyl ethyl ether, 2-chloroethyl methyl ether, 2-bromoethyl methyl ether, 2,2-dichloroethyl methyl ether, 2-chloroethyl ethyl ether, 2-bromoethyl ethyl ether, (±)-1,2-dichloroethyl ethyl ether, 2,2,2-trifluoroethyl ether, ethyl vinyl ether, butyl vinyl ether, allyl ethyl ether, allyl propyl ether, allyl butyl ether, diallyl ether, 2-methoxypropene, ethyl-1-propenyl ether, cis-1-bromo-2-ethoxyethylene, 2-chloroethyl vinyl ether, allyl-1,1,2,2-tetrafluoroethyl ether, octane, isooctane, nonane, decane, methylcyclohexane, decalin, xylene, ethylbenzene, diethylbenzene, cumene, second-butylbenzene, cymene, dipentene, methyl pyruvate, propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, butyl acetate, γ-butyrolactone, isoamyl acetate, chloroform, dichloromethane, 1,4-dioxane, hexyl alcohol, 2-heptanone, isoamyl acetate, and tetrahydrofuran.

In case where the liquid material 10 (chemical liquid) includes two kinds or more of organic solvents, the combination of the organic solvents is not particularly limited. In a case where the liquid material 10 includes two kinds or more of organic solvents, from a point of improving the advantage of the present invention, organic solvents which have, for example, different boiling points, different solubility parameters, and/or different relative dielectric constants are preferable.

In a case where the liquid material 10 includes two kinds or more of organic solvents, a substance including two kinds or more of ethers is preferable as the organic solvent. The liquid material 10 includes two kinds or more of ethers has more excellent defect suppression performance.

The type of ethers is not particularly limited, and well-known ethers can be used. For example, two kinds or more of ethers selected from the group consisting of propylene glycol monomethyl ether acetate, propylene glycol monomethyl ether, diethylene glycol monomethyl ether, diethylene glycol monoethyl ether, and diethylene glycol monobutyl ether are preferable as the two kinds or more of ethers.

Among the above substances, it is preferable that the organic solvent includes propylene glycol monomethyl ether acetate and propylene glycol monomethyl ether.

In a case where the liquid material 10 includes two kinds of organic solvent, a content mass ratio of the organic solvents is not particularly limited. Generally, the content mass ratio thereof is preferably 1/99 to 99/1, more preferably 10/90 to 90/10, and further preferably 20/80 to 60/40.

The use of the liquid material 10 is not particularly limited. Specific examples of use include at least one of developer, rinse, pre-wet, cleaner, etchant, and washing solvent for semiconductor manufacturing.

<Impurities>

Impurities contained in a processing target and/or a liquid material 10 include metallic impurities, particles, and others such as organic impurities, moisture, etc.

<Metallic Impurities>

The most common metallic impurities include heavy metals such as iron (Fe), aluminum (Al), chromium (Cr), nickel (Ni) and ionic metals such as sodium (Na) and calcium (Ca). Depending on the type of metal, metal impurities deteriorate oxide integrity, degrade MOS gate stacks, reduce lifetime of devices, etc. In a liquid material 10 (chemical liquid) prepared by the chemical liquid purification apparatus of the present disclosure, the total trace metal content is preferred to be within a predetermined range of 0 to 150 ppt in mass.

In this disclosure, metal impurities refer to metal impurities that are provided in a form of a solid (metal simplex, particulate metal-containing compound, and the like).

In this disclosure, the total trace metal in a liquid material 10 (chemical liquid) is measured by inductively coupled plasma mass spectrometry (ICP-MS) using a Fujifilm developed method. The OWMP (on-wafer metal particle) is determined by inspecting the wafer with a combination of a laser-based inspection system and an EDX (energy dispersive x-ray) inspection. The measurement methods of the total trace metal using ICP-MS and the on-wafer metal particle (OWMP) using laser and EDX are as described in the examples below.

<Particles>

In the present disclosure, the counting targets which have a size of 0.03 μm or greater are referred to as "particles". The number of "particles" in a liquid medium are to be counted by a light scattering type in-liquid particle counter and is referred as LPC (liquid particle count).

Examples of particles include dust, dirt, organic solid matters, and inorganic solid matters. The particles also may include impurities of colloidalized metal atoms. The type of the metal atoms that are easily colloidalized is not particularly limited, and may include at least one metal atom selected from the group consisting of Na, K, Ca, Fe, Cu, Mg, Mn, Li, Al, Cr, Ni, Zn, and Pb. In a liquid material 10 (chemical liquid) prepared by the chemical liquid purification apparatus of the present disclosure, the total content of the particles having a size of 0.03 μm or more is preferred to be within a predetermined range of 100 or less per 1 ml of the chemical liquid.

<Organic Impurities>

Organic impurities mean a compound which is different from the organic solvent as the main component provided in the liquid material 10 (chemical liquid), and refer to organic matter which is contained in the content of 5000 mass ppm or smaller with respect to the total mass of the liquid material 10 (chemical liquid). That is, in this specification, it is assumed that the organic matter which is contained in the content of 5000 mass ppm or smaller with respect to the total mass of the liquid material 10 corresponds to the organic impurities and does not correspond to the organic solvent.

Volatile organic compounds are present in ambient air even inside a clean-room. Some of the organic impurities originate from the shipping and storage equipment, while some are presented in a raw material from the start. Other examples of organic impurities include a by-product generated when the organic solvent is synthesized and/or an unreacted reactant.

The total content of the organic impurities in the liquid material 10 (chemical liquid) is not particularly limited. From a point of improving the manufacturing yield of a semiconductor device, the total content of the organic impurities is preferably 0.1 to 5000 mass ppm, more preferably 1 to 2000 mass ppm, further preferably 1 to 1000 mass ppm, particularly preferably 1 to 500 mass ppm, and most preferably 1 to 100 mass ppm, with respect to the total mass of the liquid material 10 (chemical liquid).

The content of the organic impurities in the chemical liquid can be measured by using a gas chromatography mass spectrometry (GCMS) device.

<Moisture (Water)>

Moisture has a destabilizing effect on the chemical and physical conditions of semiconductor surfaces. Moisture may come from the ambient air or a residue from a wet process. The moisture may be water contained inevitably in the raw material contained in the chemical liquid, or may be water inevitably contained or deliberately introduced at the time of manufacturing the chemical liquid.

The content of the water in the liquid material 10 (chemical liquid) is not particularly limited. Generally, the content of the water is preferably equal to or smaller than 2.0 mass %, more preferably equal to or smaller than 1.0 mass %, and further preferably smaller than 0.5 mass %, with respect to the total mass of the liquid material 10 (chemical liquid). If the content of the water in the liquid material 10 (chemical liquid) is equal to or smaller than 1.0 mass %, the manufacturing yield of a semiconductor chip is more improved. A lower limit is not particularly limited, but may be about 0.01 mass % in many cases. In manufacturing, it is difficult to set the content of the water to be equal to or smaller than the above value.

The content of the water means a moisture content may be measured by using a device which uses the Karl Fischer moisture measurement method as a measurement principle.

In the following, the embodiments of the present disclosure describe an exemplary chemical liquid purification apparatus and an exemplary manufacturing/purification method of a liquid material 10 (chemical liquid) using the same. The chemical liquid purification apparatus comprises at least a plurality of material treatment systems such that the number of unwanted particulates (particles) and the amount of metallic impurities in the liquid material 10 (chemical liquid) prepared using the chemical liquid purification apparatus are limited within predetermined ranges. Hence, the occurrence of residue and/or particle defects is suppressed and the yield of semiconductor wafer is improved.

<Chemical Liquid Purification Apparatus>

Referring to FIG. 1, in some embodiments, the chemical liquid purification apparatus 100 includes a tank body 110, a return tube 120, a piping, 122, a liquid sending pump 124, a filtration device (126, 130), and an extraction tube 140.

In some embodiments, the tank body 110 has a manhole 112, an air hole 114, a liquid hole 116 and a circulation hole 118. The manhole 112, the air hole 114, the liquid hole 116 and the circulation hole 118 are communicated to a storage space S12 inside the tank body 110. The manhole 112 is an opening that enables a staff to enter the storage space S12 inside the tank body 110. The size of the manhole 112 is designed mainly based on a factor of allowing the staff to pass through. For example, the manhole 112 of the present embodiment is a circular hole with a diameter of approximately 50 cm. However, the disclosure is not limited thereto, and a design of the manhole 112 can be adjusted based on requirement. The manhole 112 is generally not being used to load and unload fluid to be stored in the tank body 110. Moreover, the number of the manhole 112 may also be increased.

The air hole 114 is mainly used to provide a pathway for gas to enter and exit the storage space S12 inside the tank body 110. For example, when a liquid material 10 (or chemical liquid) is inputted into the storage space S12 through the liquid hole 116, the air hole 114 may enable the gas inside the storage space S12 to flow out, so that the liquid material 10 can be smoothly inputted into the storage space S12. Moreover, when the liquid material 10 is a material liable to produce a chemical reaction with air, then an inert gas such as nitrogen may further be injected through the air hole 114 so as to provide a better storage environment for the liquid material 10. The air hole 114 of the present embodiment is a circular hole with a diameter of approximately 2 cm, but the invention is not limited thereto. The design of the air hole 114 may be adjusted based on requirement. In addition, the air hole 114 may further be communicated to a barometer (not shown), so as to control a gas pressure status inside the storage space S12. Moreover, the number of the air hole 114 may also be increased.

The liquid hole 116 and the circulation hole 118 are mainly used to provide pathways for the liquid material 10 to enter/exit the storage space S12 inside the tank body 110. The liquid hole 116 and the circulation hole 118 of the present embodiment are circular holes each with a diameter of approximately 10 cm, but the invention is not limited thereto. The dimensions of the liquid hole 116 and the circulation hole 118 may be adjusted based on requirement. In the exemplary embodiment, the liquid hole 116 and the circulation hole 118 may respectively be used as a pathway for the liquid material 10 to enter the tank body 110 and a pathway for the liquid material 10 to exit the tank body 110, so that a good convection of the liquid material 10 within the storage space S12 inside the tank body 110 can be obtained.

In some embodiments of the present disclosure, the tank body 110 further includes a manhole port V12, an air hole port V14, a liquid passage port V16 and a circulation port V18 respectively mounted to the manhole 112, the air hole 114, the liquid hole 116 and the circulation hole 118. The manhole port V12, the air hole port V14, the liquid passage port V16 and the circulation port V18 are configured to isolate the storage space S12 inside the tank body 110 from the outside. In the exemplary embodiment, one end of the return tube 120 is connected to the circulation port V18 passing through the circulation hole 118, while another end of the return tube 120 is extending towards the storage space S12 inside the tank body 110. With the configuration of the return tube 120, the liquid material 10 may be prevented of directly dropping from the top when returning back into the storage space S12, and thus a possibility of producing bubbles or other circumstances affecting the quality of the liquid material 10 may be reduced. Furthermore, in some embodiments, one end of the extraction tube 140 is connected to the liquid passage port V16 passing through the liquid hole 116, while another end of the extraction tube 140 is extending towards the bottom of the storage space S12. With the configuration of the extraction tube 140, the liquid material 10 may be extracted from the bottom of the storage space S12, and thereby prevent the liquid material 10 at the bottom from being deteriorated due to a long-term lack of liquidity.

In some embodiments, a ratio of a length L12 of the return tube 120 to a height L11 of the tank body 110 is in a range of 1:10 to 2:10. In other words, the length L12 of the return tube 120 should be shorter than 20% of the height L11 of the tank body 110, or be within 10~20% of the height L11 of the tank body 110. Furthermore, the length L12 of the return tube 120 cannot be greater than a length of the extraction tube 140. By arranging the return tube 120 and the extraction tube 140 in such a way, the flow of the liquid material 10 (chemical liquid) inside the tank body 110 may be optimized, and turbulent flow is prevented.

In an embodiment of the invention, the chemical liquid purification apparatus 100 further includes a liquid sending pump 124 and a filtration device (126, 130) located outside the tank body in between the liquid passage port V16 and the circulation port V18. Furthermore, a piping 122 is connecting the liquid sending pump 124 and the filtration device (126, 130) to the liquid passage port V16 and the circulation port V18. For example, in one embodiment, when the liquid material 10 is extracted from inside the storage space S12 through the liquid passage port V16, the liquid material 10 will sequentially pass through the liquid sending pump 124 and the filtration device (126, 130) via the piping 122, whereas the filtered liquid material 10 (chemical liquid) is returned back to the storage space S12 through the return tube 120. Due to the presence of the liquid sending pump 124 and the filtration device (126, 130), the quality of the obtained chemical liquids is significantly improved, while the manufacture throughput time and facility investigation costs are reduced. Moreover, the chemical liquid purification apparatus 100 may even be used as a long-term storage space for the liquid material 10 before transportation.

In the exemplary embodiment, the liquid sending pump 124 is a non-volumetric type pump selected from the group consisting of a centrifugal pump, a mixed flow pump and an axial flow pump. In certain embodiments, the liquid sending pump 124 is a centrifugal pump. By using the centrifugal pump as the liquid sending pump 124, the filtered liquid material 10 (chemical liquid) obtained may have improved quality. In some embodiments, the liquid sending pump 124 is preferably a pump in which pulsation does not occur easily. Furthermore, it is preferable that a liquid contacting surface of the pump contains a fluorocarbon resin.

As illustrated in FIG. 1, the filtration device (126, 130) may be used for a particle removing process. The particle removing process is a process of removing particles and/or metal impurities (metal impurities in a solid form) in the processing target by using a particle removal filter. The particle removal filter is not particularly limited, and well-known particle removal filters can be used.

Although the average pore size (pore diameter) of the particle removal filter is not particularly limited, it is suitably about 0.001 to 1.0 μm (1 nm to 1000 nm), preferably about 0.01 to 0.5 μm (10 nm to 500 nm), and more preferably about 0.01 to 0.1 μm (10 nm to 100 nm). Within this range, it is possible to reliably remove foreign matters such as impurities or aggregates contained in the refined product while suppressing clogging of the filter.

In the exemplary embodiment, the filtration device (126, 130) may include at least a first filter 126 and a second filter 130 as the particle removal filters. The first filter 126 is located in between the second filter 130 and the liquid passage port V16, and the second filter 130 is located in between the first filter 126 and the circulation port V18. In other words, when the liquid material 10 is extracted from inside the storage space S12 through the liquid passage port V16, it sequentially passes through the liquid sending pump 124, the first filter 126 and the second filter 130 before returning to the storage space S12 via the return tube 120.

In the present embodiment, the first filter 126 may be a particle removal filter having an average pore size as small as 2 nm (for example, microfiltration membrane having a pore size of 2 nm or greater), and may range from 0.002 μm (2 nm) or more to about 1.0 μm (1000 nm) or less. In a case where fine particles are provided in the processing target in addition to colloidalized impurities including metal atoms such as iron or aluminum, the processing target is filtered by using a filter having an average pore size as small as 50 nm to remove particles before filtering is performed by using a filter having average pore size as small as 20 nm or 15 nm to remove finer particles. Thus, the filtration efficiency is improved and performance of removing particles is more improved.

In some embodiments of the disclosure, the second filter 130 may be a particle removal filter having a pore size as small as 0.001 μm (1 nm), and may range from about 0.001 μm (1 nm) or more to about 0.015 μm (15 nm) or less. In certain embodiments, the second filter 130 may include a UPE filter having a pore size as small as 3 nm. Yet in other embodiments, the second filter 130 may include a Nylon or a MPTFE filter having a pore size of about 5 nm. Here, the average pore size can refer to the nominal value of the filter manufacturer. By using filters having such pore sizes, coarse particle and/or metal impurities (metal impurities provided in the chemical liquid, in a solid form) may be efficiently removed, while an occurrence of filter clogging is suppressed.

Moreover, in certain embodiments, the pore size of the first filter 126 is R1 and the pore size of the second filter 130 is R2, and R1≥R2. In other words, the pore size of the first filter 126 is larger than or equal to the pore size of the second filter 130. In case where the pore size of the first filter 126 is equal to the pore size of the second filter 130, the first filter 126 and the second filter 130 are made of the same material. In a preferred embodiment, the pore size of the first filter is R1 and the pore size of the second filter is R2, and R1>R2. In other words, it is preferable that the pore size of the first filter 126 is larger than the pore size of the second filter 130. In case where the pore size of the first filter 126 is larger than the pore size of the second filter 130, the first filter 126 and the second filter 130 may be made of different materials, or may be made of same materials based on requirement. In case where the pore size of the first filter 126 is set to be larger than the pore size of the second filter 130, fine foreign matters mixed in the liquid material 10 is more reliably removed.

In one exemplary embodiment, the materials of the first filter 126 and the second filter 130 used for particle removal may include a fluororesin such as polytetrafluoroethylene (PTFE), a polyamide resin such as nylon and the like, a polyolefin resin (including high density and ultrahigh molecular weight) such as polyethylene (HDPE) and polypropylene (PP) and the like, a perfluoroalkoxy (PFA) resin and the like, or a modified polytetrafluoroethylene (MPTFE). In view of efficiently removing fine foreign matters such as impurities and/or aggregates contained in a chemical liquid, the filter used in particle removal of the present disclosure is made of at least one selected from the group consisting of nylon, polypropylene (including high density polypropylene), polyethylene, polytetrafluoroethylene, tetrafluoroethylene-perfluoroalkyl vinyl ether copolymer, polyimide, and polyamide imide. According to the filter made of the above material, it is possible to effectively remove foreign matter having high polarity which is likely to cause residue defects and/or particle defects, and it is possible to efficiently reduce the content of the metal component in the liquid material 10 (chemical liquid).

Polyimide and/or polyamide imide may have at least one selected from the group consisting of a carboxy group, a salt type carboxy group, and a —NH-bond. Regarding solvent resistance, a fluororesin, polyimide, and/or polyamide imide is excellent.

As a commercial filter, for example, filters manufactured by Pall Corporation, ADVANTEC Toyo Roshi Kaisha, Ltd., Entegris Japan Co., Ltd. (former Nihon microlith Corporation) and KITZ MICRO FILTER CORPORATION can be selected from various filters to be provided. In addition, a "P-Nylon filter (pore size of 0.02 μm and critical surface tension of 77 mN/m)" (manufactured by Pall Corporation) made of polyamide; a "PE·clean filter (pore size of 0.02 μm)" (manufactured by Pall Corporation) made of high-density polyethylene; a "PE·clean filter (pore size of 0.01 μm)" (manufactured by Pall Corporation) made of high-density polyethylene; and an "UPE (pore size of 3 nm)" (manufactured by Entegris) made of ultra-high molecular weight polyethylene membrane can be used.

In some embodiments, the filtration device may further include an ion-exchange resin membrane. The ion-exchange resin membrane used in the present embodiment is not particularly limited, and filters including an ion-exchange resin comprising a suitable ion-exchange group immobilized to a resin membrane may be used. Examples of such ion-exchange resin membranes include strongly acidic cation-exchange resins comprising a cation-exchange group such as a sulfonic acid group chemically modified on the resin membrane, and examples thereof include cellulose, diatomaceous earth, nylon (a resin having an amide group), polyethylene, polypropylene, polystyrene, a resin having an imide group, a resin having an amide group and an imide group, a fluororesin, or a high-density polyethylene membrane and ion-exchange resin membranes with a particle-removing membrane that is a membrane having an integral structure of a particle-removing membrane and an ion-exchange resin membrane. Polyalkylene membranes with an ion-exchange group chemically modified thereon are preferred. Polyalkylenes include, for example, polyethylene and polypropylene, and polypropylene is preferred. Cation-exchange groups are preferred as the ion-exchange group. Ion-exchange resin membranes used in the present embodiment may be commercially available filters with metal ion removal functionality. These filters are selected based on the ion exchange efficiency and with an estimated pore size of the filters as small as about 0.2 μm (200 nm).

In certain embodiments, the filtration device may further include an ion adsorption membrane. The ion adsorption membrane has a porous membrane material and has an ion exchange function. Such ion adsorption membrane is not particularly limited as long as it has a pore diameter of 100 μm or less and has an ion exchange function. The material, the type and the like thereof are not particularly limited. Examples of the material of a base material constituting the ion adsorption membrane include, but not limited to, cellulose, diatomaceous earth, film material of microfiltration membrane such as nylon (resin having amide group), polyethylene, polypropylene, polystyrene, resin having imide group, resin having amide group and imide group, fluororesin, or high density polyethylene resin, a membrane material having an ion exchange ability functional group introduced therein, or the like. Examples of the shape of the membrane material include a pleated type, a flat membrane type, a hollow fiber type, a porous body as described in JP-A No. 2003-112060 and the like. As the ion exchange group to be introduced into the membrane material, it is preferable to use a combination of at least two of the cation exchange group, the chelate exchange group, and the anion exchange group to optimize the elution and selectivity of the components to be removed. Since the ion adsorption membrane has porosity, it is also possible to remove a part of the fine particles. In certain embodiments of the disclosure, the ion adsorption membrane is, for example, a nylon membrane having a pore diameter as small as 0.02 μm (20 nm).

In some exemplary embodiments, in the process for preparing a liquid material 10 (chemical liquid) of the present disclosure, the ion-exchange resin membrane or ion adsorption membrane are brought into contact with an organic solvent in advance. There is a commercially available product in a dry state of the ion-exchange resin membrane or ion adsorption membrane. Furthermore, there is also a hydrophilic material having a high level of affinity for aqueous solutions. In the present embodiment, even when such ion-exchange resin membranes or ion adsorption membranes are used, a preliminary contact with an organic solvent allows metal impurities in the untreated liquid material 10 (chemical liquid) to be effectively removed and the reduction effect is significantly superior to the case of the ion-exchange resin membrane or ion adsorption membrane having not been brought into contact with the organic solvent in advance.

According to some embodiments of the disclosure, it is preferable not to use reverse osmosis membranes (RO filter) as used in aqueous solvents.

Moreover, in the present embodiment, a liquid contacting surface of the tank body 110 is made of fluororesin. In other words, inner walls of the tank body 110 may be selectively coated with fluororesin, or other materials that are not adhesive to the liquid material 10. Similarly, a liquid contacting surface of the return tube 120 and the extraction tube 140 are made of fluororesin. In other words, inner walls of the return tube 120 and the extraction tube 140 may be selectively coated with fluororesin, or other materials that are not adhesive to the liquid material 10. In some embodiments, a liquid contacting surface of the piping 122 is electrolytic polished stainless steel (SUS). By selecting the appropriate materials for the tank body 110, the return tube 120, the piping 122, the first filter 126, the second filter 130, the extraction tube 140, and the member of the liquid material of the present invention, the filtered liquid material 10 (chemical liquid) obtained may have improved quality.

In the exemplary embodiment, the tank body 110 is a movable type tank body (a tank that can be transported). For example, in certain embodiments, the tank body 110 is a tank body of a lorry. In other words, the chemical liquid purification apparatus 100 may be configured as part of a lorry. Furthermore, in the present embodiment, the circulation hole 118 and the liquid hole 116 are respectively being close to the front end or the rear end of the tank body 110. In other words, the circulation hole 118 and the liquid hole 116 are respectively being close to the two ends of the tank body 110 and are not being close to each other, so that the liquid material 10 can produce better convection. Herein, the front end of the tank body 110 denotes to an end of the tank body 110 that faces towards the front during the process of transportation, but the invention does not limit which one of the circulation hole 118 and the liquid hole 116 is to be close to the front end of the tank body 110.

In some embodiments, a purification method of using the chemical liquid purification apparatus 100 above includes the steps of: purifying a liquid material 10 (chemical liquid/solvents) in the tank body 110 by extracting the liquid material 10 from inside the storage space S12 via the extraction tube 140 through the liquid passage port V16, and passing the liquid material 10 through the liquid sending pump 124 and the filtration device (126, 130) via the piping 122, and returning the liquid material 10 back to the storage space S12 via the return tube 120. Preferably, the tank body 110 is purged and sealed with nitrogen ($N_2$ gas) through the air hole 114, and that the liquid material 10 (chemical liquid) is purified while applying positive pressure. By using the method above for purifying the liquid material 10, contamination and impurities in the liquid material 10 may be prevented.

In some embodiments, the purification method may further include a moisture adjusting process. The moisture adjusting process is a process of adjusting the content of water included in the purification target. A method of adjusting the content of water is not particularly limited. A method of adding water to the purification target, and a method of removing water from the purification target are exemplified.

A method of removing water is not particularly limited, and well-known dehydration methods can be used.

Regarding the method of removing water, a dehydration membrane, a water absorbent which is insoluble in an organic solvent, an aeration replacement device using a dried inert gas, a heating or vacuum heating device, and the like are exemplified.

In a case where the dehydration membrane is used, membrane dehydration by pervaporation (PV) or vapor permeation (VP) is performed. The dehydration membrane is configured in a form of a water permeable membrane module, for example. A membrane formed from a polymer material such as polyimide, cellulose, and polyvinyl alcohol or an inorganic material such as zeolite can be used as the dehydration membrane.

The water absorbent is used in a manner of being added to the purification target. Examples of the water absorbent include zeolite, diphosphorus pentaoxide, silica gel, calcium chloride, sodium sulfate, magnesium sulfate, anhydrous zinc chloride, fuming sulfuric acid, and soda lime.

In a case where zeolite (in particular, MOLECULAR SIEVE (product name) and the like manufactured by UNION SHOWA Corporation) is used in a dehydration treatment, olefins can also be removed.

It is preferable that the above-described component adjustment process is performed in a sealed state under an atmosphere of an inert gas, in which a probability of mixing water to the purification target is low.

It is preferable that the above treatments are performed under an atmosphere of an inert gas, in which a dew point temperature is equal to or lower than −70° C., in order to largely suppress mixing of moisture. The reason is because a probability of mixing moisture into the organic solvent is low, since moisture concentration in a gas phase is equal to or smaller than 2 mass ppm under the atmosphere of an inert gas at −70° C. or lower.

The manufacturing method of the liquid material 10 (chemical liquid) may include an absorption purification treatment process of a metal component, which uses silicon carbide and is disclosed in PCT International Publication WO2012/043496, in addition to the above processes.

In the manufacturing method/purification method of the liquid material 10 (chemical liquid), a part coming into contact with the chemical liquid in a device and a process relating to manufacturing, storing, and transferring is preferably washed before the chemical liquid is manufactured. A liquid used in washing is not particularly limited. As the liquid, the chemical liquid itself, or a liquid obtained by diluting the chemical liquid is preferable. In addition, an organic solvent in which particles containing metal atoms, metal ion components, and organic impurities are substantially not included or the amount thereof is sufficiently reduced can be used. Washing may be performed plural times. Two different kinds or more of organic solvents may be used, or may be used without mixing the organic solvents. The washing may be circulation washing.

It can be determined whether or not the device relating to manufacturing is sufficiently washed, by measuring metal atoms, metal ion components, and the like which are included in a liquid used when washing is performed. As a criterion of the washing, the content of a metal atom included in a liquid after washing is preferably equal to or smaller than 10 mass ppm, more preferably equal to or smaller than 0.1 mass ppm. It is further preferable that washing is performed until the content of metal atom included in a liquid after washing is equal to or smaller than 0.001 mass ppm.

As an example of performing washing before manufacturing/purification, an example of washing of the filters in the filtering process is exemplified.

Before the filter is used, the filter may be washed. A method of washing the filter is not particularly limited. A method of immersing a filter in a washing liquid, a method of causing a washing liquid to pass through a filter, and a method obtained by combining the above methods are exemplified.

Since the filter is washed, it is easy to control the amount of a component extracted from the filter. As a result, a liquid material 10 or chemical liquid having a more excellent advantage of the present invention is obtained.

The washing liquid is not particularly limited, and well-known washing liquids can be used. Examples of the washing liquid include water and an organic solvent. As the organic solvent, an organic solvent which may be contained in the liquid material 10 or chemical liquid may be provided. Examples of such an organic solvent include alkylene glycol monoalkyl ether carboxylate, alkylene glycol monoalkyl ether, lactic acid alkyl ester, alkyl alkoxypropionate, cyclic lactone (preferably 4 to 10 carbon atoms), a monoketone compound (preferably 4 to 10 carbon atoms) which may have a ring, alkylene carbonate, alkoxy alkyl acetate, and alkyl pyruvate.

More specifically, examples of the washing liquid include propylene glycol monomethyl ether, propylene glycol monomethyl ether acetate, dimethyl sulfoxide, n-methyl pyrrolidone, diethylene glycol, ethylene glycol, dipropylene glycol, propylene glycol, ethylene carbonate, propylene carbonate, sulfolane, cyclohexane, cyclohexanone, cycloheptanone, cyclopentanone, 2-heptanone, γ-butyrolactone, n-Butyl acetate, and mixtures thereof.

Before the washing, a process of wetting (for example, immersing) the filter in an organic solvent may be provided. Since the process of being wet in the organic solvent is previously performed, the amount of wet particles is reduced and filtration efficiency is improved.

The organic solvent used in the process of performing wetting is not particularly limited, and an organic solvent described above is exemplified. Although being not particularly limited, if an organic solvent having surface tension which is lower than that of a liquid material 10 (chemical liquid) to be manufactured is used, filtration efficiency is improved.

It is preferable that the organic solvent and the washing liquid are high-purity products in which the amount of impurities is small. A liquid material 10 or chemical liquid to be manufactured may be similar.

Figure 2:
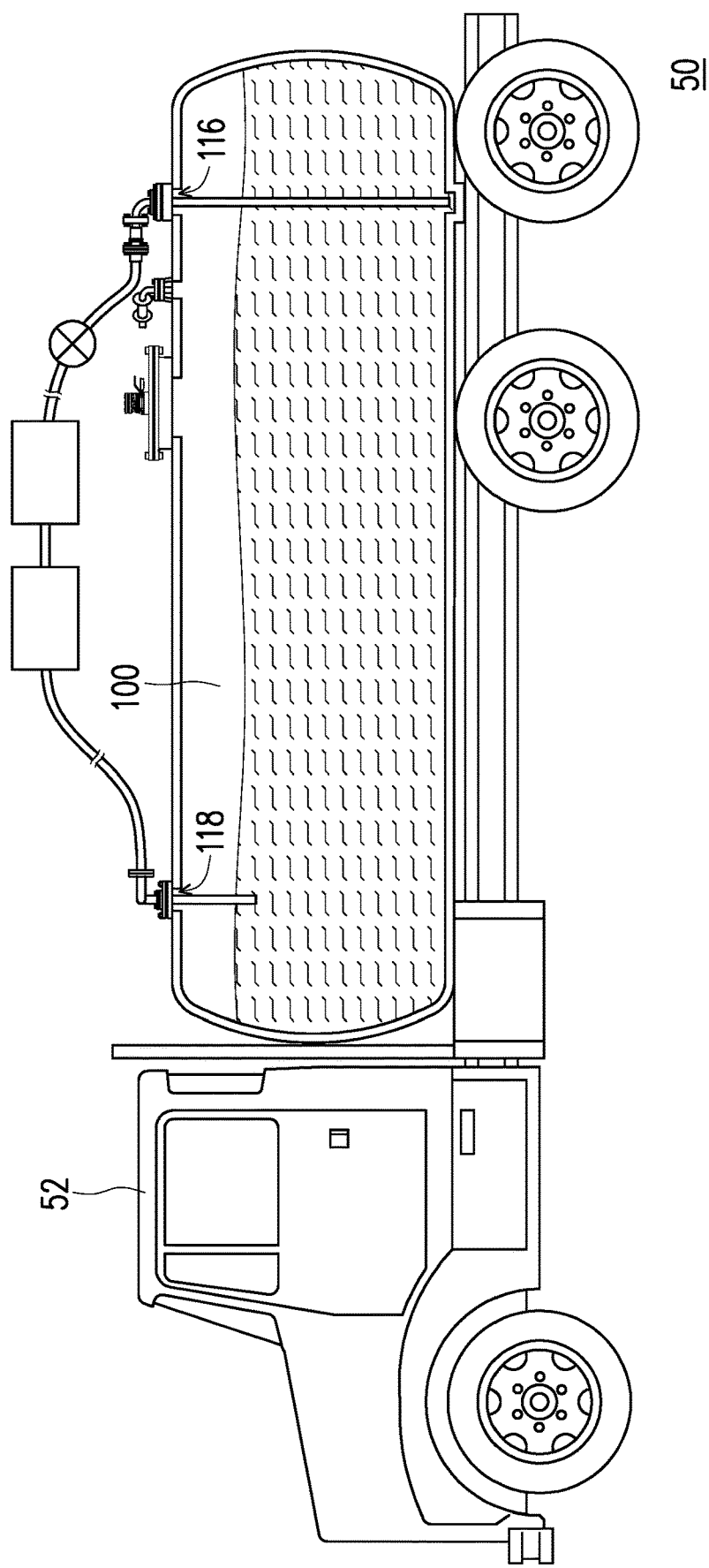
FIG. 2 is a schematic view of a lorry including the chemical liquid purification apparatus according to some embodiments of the invention.

FIG. 2 is a schematic view of a lorry including the chemical liquid purification apparatus according to some embodiments of the invention. Referring to FIG. 2, the lorry 50 of the present embodiment includes a head 52 and a chemical liquid purification apparatus 100 (lorry tank) connected to the head 52. The chemical liquid purification apparatus 100 shown in FIG. 2 is the same as the chemical liquid purification apparatus 100 shown in FIG. 1, hence, the same reference numerals are used to refer to the same and liked parts, and its detailed description will be omitted herein. The lorry 50 of the present embodiment is designed as having the chemical liquid purification apparatus 100 (storage tank) being directly fixed on a carriage behind the head 52 for an example, and this kind of design is more suitable for a small lorry tank (smaller apparatus 100), but the invention is not limited thereto. In the present embodiment, the circulation hole 118 is, for example, closer to the head 52 and the liquid hole 116 is, for example, further away from the head 52, but the invention is not limited thereto.

Figure 3:
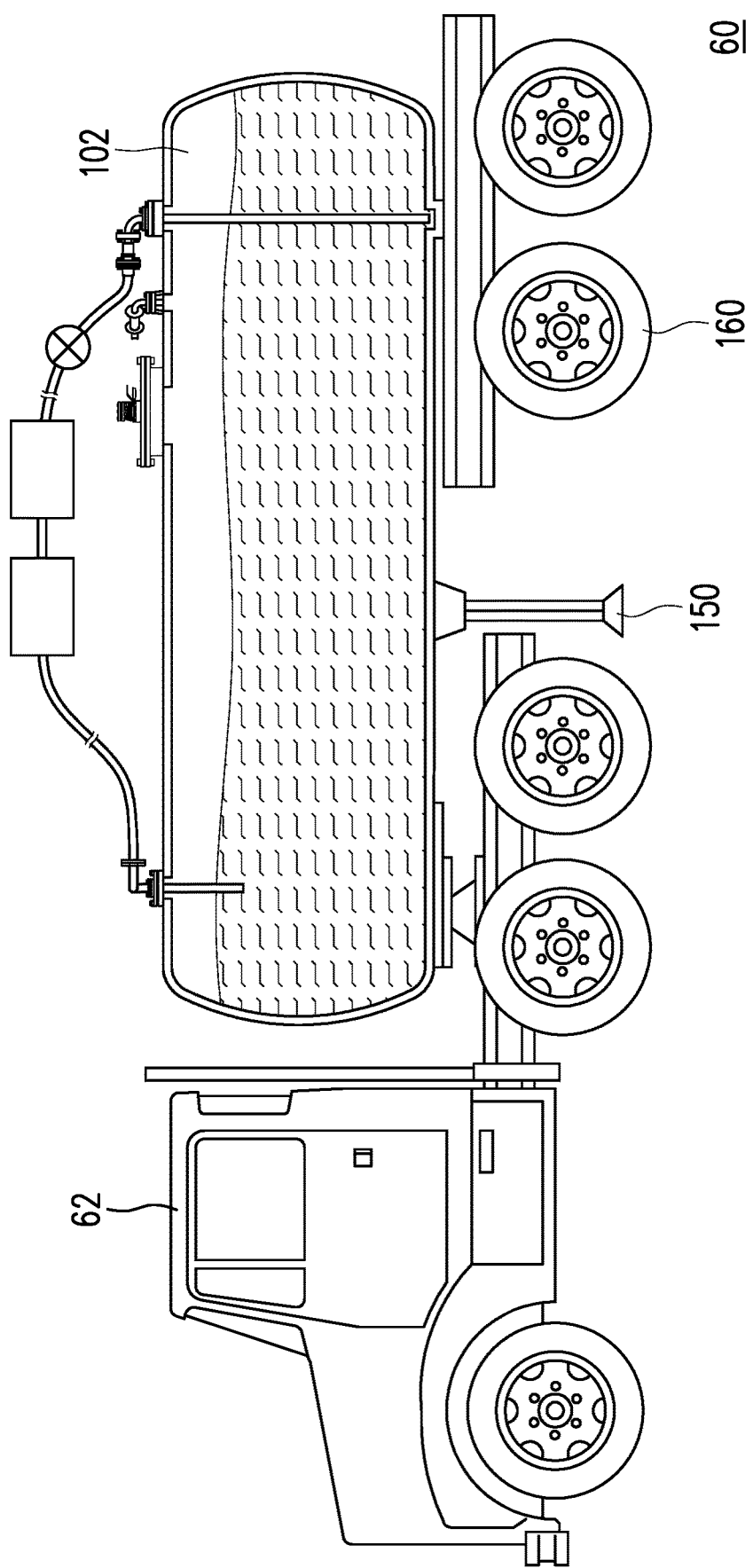
FIG. 3 is a schematic view of a lorry including the chemical liquid purification apparatus according to some other embodiments of the invention.

FIG. 3 is a schematic view of a lorry including the chemical liquid purification apparatus according to some other embodiments of the invention. Referring to FIG. 3, the lorry 60 of the present embodiment is similar to the lorry 50 of FIG. 2, and thus only the differences between the two are described herein. A chemical liquid purification apparatus 102 of the present embodiment is similar to the chemical liquid purification apparatus 102 of FIG. 1, but the chemical liquid purification apparatus 102 of the present embodiment further includes a support 150 and a wheel set 160, which are both mounted at the bottom of the tank body 110. The support 150 is close to the front end of the tank body 110, and the wheel set 160 is close to the rear end of the tank body 110. The front end of the chemical liquid purification apparatus 100 is rotatably connected to the head 62. In other words, the head 62 of the lorry 60 of the present embodiment may be a head of a commonly seen tractor trailer, and can be replaced. This kind of design is more suitable for a large lorry tank (larger apparatus 102), but the invention is not limited thereto.

Overall, the chemical liquid purification apparatus of the present disclosure is at least configured with a liquid sending pump and a filtration device located in between the liquid passage port and the circulation port. Therefore, high quality (low particle) chemical liquids can be obtained, while the manufacture throughput time and facility investigation costs are reduced.

In the above embodiments, it is preferable that all processes regarding handling which includes manufacturing of a liquid material 10 (chemical liquid), filling of the chemical liquid, and the like, treatment analysis, and measuring are performed in a clean room. It is preferable that the clean room satisfies the 14644-1 clean room standards. The clean room preferably satisfies any of ISO (International Organization for Standardization) Class 1, ISO Class 2, ISO Class 3, and ISO Class 4. It is more preferable that the clean room satisfies ISO Class 1 or ISO Class 2, and it is further preferable that the clean room satisfies ISO Class 1.

As the inert gas (such as nitrogen gas) used in the present invention, a high purity gas of 99.99% or more is preferably used. It is further preferable to use it for purification before the liquid purification process.

EXAMPLES

In order to prove that the chemical liquid purification apparatus of the present disclosure is useful in providing high quality (low particle) chemical liquids, the following experimental examples are performed for evaluation.

The present invention will be more specifically described below based on these examples. A material, a use amount, a ratio, treatment details, treatment procedures, and the like which will be described in the following examples can be appropriately changed in a range without departing from the gist of the present invention. Accordingly, the range of the present invention should not be interpreted restrictively by the following examples. Furthermore, "%", "ppt", and "ppm" are based on the mass, so long as particular statements are not made.

<Preparation of Liquid Material/Chemical Liquid>

Liquid materials or chemical liquids in examples and comparative examples are respectively prepared by performing the following purification treatment on a raw material solution. A raw material solution having a high purity grade in which purity is equal to or greater than 99 mass % was used.

Specifically, regarding preparation of each chemical liquid, the raw material solution was caused to pass through the following filter and/or the following moisture adjustment means, and thus concentration of each component was adjusted.

First metal ion absorption filter (15 nm IEX PTFE (filter which is made of PTFE, has a sulfo group on the surface of a base material, and has a pore size of 15 nm) manufactured by Entegris Inc.)

Particle removal filter (12 nm PTFE (filter which is made of PTFE and has a particle removal diameter of 12 nm) manufactured by Entegris Inc.)

Second metal ion absorption filter (15 nm IEX PTFE (filter which is made of PTFE, has a sulfo group on the surface of a base material, and has a pore size of 15 nm) manufactured by Entegris Inc.)

Organic impurity absorption filter (special filter A (filter which is disclosed in JP-A-2013-150979 and in which activated carbon is stuck to nonwoven fabric))

Moisture adjustment means including MOLECULAR SIEVE 3A (manufactured by UNION SHOWA Corporation, dehydrating agent)

The number of times of passing through the filter and/or the moisture adjustment means and the type of a raw material solution to be used were adjusted, and thus a chemical liquid having a composition in each of the examples and the comparative examples was prepared.

When the chemical liquids in the examples and the comparative examples were prepared, all processes relating to preparation of the chemical liquid, filling, storing, and analysis measurement were performed in a clean room having a level which satisfied ISO Class 2 or smaller. In order to improve measurement accuracy, regarding measurement of the content of organic impurities and measurement of the content of a metal atom, when measurement in a range which was equal to or lower than a detection limitation in general measurement was performed, measurement was performed in a state where the chemical liquid was condensed to be 1/100 in terms of volume. Then, the value was converted into concentration of a solution before condensation, and thus the content was calculated.

Examples 1 to 16

In examples 1 to 16, chemical liquids are purified using a chemical liquid purification apparatus having the different components listed in Table 1. The purified chemical liquids are evaluated for their handling properties, and evaluated for the presence of trace metals and online wet particles.

For the handling properties, it is determined to be "good" if high quality of final production can be obtained stably, and it is determined to be "poor" if good quality of final production cannot be kept in some cases. The evaluation results are presented in Table 2.

<Total Trace Metal (ppb) Evaluation>

For the evaluation of trace metals, each chemical liquid sample was tested using ICP-MS (inductively coupled plasma mass spectrometry (ICP-MS) using a Fujifilm developed method, each sample was tested for the presence of 26 metal species, the detection limit was metal specific, but the typical detection limits were in the range of 0.00010-0.030 ppb. The concentration of each metal species was then totalized to produce the value shown as total trace metal (ppb). The evaluation results are presented in Table 2. In Table 2, the trace metals are scored according to the following criteria:

5 points: significantly low amount of trace metals (<10 ppt);

4 points: low amount of trace metals (10 ppt<20 ppt);

3 points: satisfactory amount of trace metals (20 ppt<30 ppt);

2 points: high amount of trace metals (30 ppt<100 ppt);

1 point: significantly high amount of trace metals (>100 ppt).

<Online Wet Particles Count Evaluation>

A liquid particle count (LPC) is connected with the facility to check the online wet particle performance during the purification process. Each sample was tested using the liquid particle counter, whereby the instrument used a laser light to count and size the particles in the liquid sample, with a detection limit down to 0.04 μm. The reported value has the unit of "particles/ml".

In Table 2, the online wet particles are scored according to the following criteria:

5 points: very good hard particles and very good stain defect (LPC 0.04 μm<10(particles/m1), stain defect 0%);

4 points: good hard particles and good stain defect (LPC 0.04 μm<30(particles/m1), stain defect around 10%);

3 points: good hard particles and poor stain defect, or poor hard particles and good stain defect (LPC 0.04 μm<30 (particles/ml), stain defect over 50%, or LPC 0.04 μm>100 (particles/ml), stain defect around 10%);

2 points: poor hard particles and poor stain defect (LPC 0.04 μm>100(particles/ml), stain defect over 50%);

1 point: very poor hard particles and very poor stain defect (LPC 0.04 μm>1000(particles/ml), stain defect 100%.

In general, a score of 3 points or more was determined to be an acceptable level for the trace metals and online wet particles.

Comparative Examples 1 and 2

In comparative examples 1 and 2, chemical liquids are purified using a chemical liquid purification apparatus having the different components listed in Table 1. The difference between comparative example 1 and example 1 is that the chemical liquid purification apparatus of comparative example 1 has no liquid sending pump. Furthermore, the difference between comparative example 2 and example 1 is that the chemical liquid purification apparatus of comparative example 2 has no filtration device. The purified chemical liquids are evaluated for their handling properties, and evaluated for the presence of trace metals and online wet particles in the same way as in examples 1-16. The evaluation results are presented in Table 2.

TABLE 1

| Example No. | *Feature (a) (yes/no) | Liquid sending pump (yes/no) | Filtration device First filter R1 | Filtration device Second filter R2 | Filtration device Others | Lorry type (yes/no) | **Material of Filter is PTFE (yes/no) | Filter pore size < 100 nm (yes/no) |
|---|---|---|---|---|---|---|---|---|
| Example 1 | yes | yes | 50 nm PTFE | 20 nm PTFE | — | yes | yes | yes |
| Comparative Example 1 | yes | no pump | 50 nm PTFE | 20 nm PTFE | — | yes | yes | yes |
| Comparative Example 2 | yes | yes | No filter | | | yes | — | — |

TABLE 1-continued

| Example | | | | | | | | |
|---|---|---|---|---|---|---|---|---|
| Example 2 | yes | yes | 200 nm PTFE | none | — | yes | yes | no |
| Example 3 | yes | yes | 50 nm PTFE | none | — | yes | yes | yes |
| Example 4 | yes | yes | 50 nm PTFE | 20 nm PTFE | — | no | yes | yes |
| Example 5 | yes | yes | 20 nm Nylon | 5 nm HDPE | — | yes | no | yes |
| Example 6 | yes | yes | 200 nm UPE | 200 nm PTFE | — | yes | yes | no |
| Example 7 | yes | yes | 20 nm Nylon | 5 nm HDPE | — | yes | no | yes |
| Example 8 | yes | yes | 20 nm Nylon | 5 nm HDPE | — | yes | no | yes |
| Example 9 | yes | yes | 20 nm Nylon | 5 nm HDPE | — | yes | no | yes |
| Example 10 | yes | yes | 20 nm Nylon | 5 nm HDPE | — | yes | no | yes |
| Example 11 | yes | yes | 5 nm HDPE | 20 nm Nylon | — | yes | no | yes |
| Example 12 | yes | yes | 20 nm Nylon | 5 nm HDPE | — | yes | no | yes |
| Example 13 | yes | yes | 20 nm Nylon | 10 nm Nylon | — | yes | no | yes |
| Example 14 | yes | yes | 20 nm Nylon | 10 nm PTFE | — | yes | yes | yes |
| Example 15 | yes | yes | 50 nm PTFE | 10 nm PTFE | 5 nm Nylon | yes | yes | yes |
| Example 16 | yes | yes | 20 nm PTFE | 10 nm PTFE | Ion exchange filter (IonKleen) | yes | yes | yes |

| Example No. | Type of pump | **Material of tank body is PTFE (yes/no) | Piping: electrolytic polished SUS (yes/no) | **Material of return/ extraction tube is PTFE (yes/no) | Filter pore size R1 > R2 (yes/no) | $N_2$ gas purging during purification (yes/no) |
|---|---|---|---|---|---|---|
| Example 1 | Centrifugal | yes | yes | yes | yes | yes |
| Comparative Example 1 | — | yes | yes | yes | yes | yes |
| Comparative Example 2 | Centrifugal | yes | yes | yes | — | yes |
| Example 2 | Centrifugal | yes | yes | yes | — | yes |
| Example 3 | Centrifugal | yes | yes | yes | — | yes |
| Example 4 | Centrifugal | yes | yes | yes | yes | yes |
| Example 5 | Centrifugal | yes | yes | yes | yes | yes |
| Example 6 | Centrifugal | yes | yes | yes | no | yes |
| Example 7 | Diaphragm | yes | yes | yes | yes | yes |
| Example 8 | Centrifugal | no | yes | yes | yes | yes |
| Example 9 | Centrifugal | yes | no | yes | yes | yes |
| Example 10 | Centrifugal | yes | yes | no | yes | yes |
| Example 11 | Centrifugal | yes | yes | yes | no | yes |
| Example 12 | Centrifugal | yes | yes | yes | yes | no |
| Example 13 | Centrifugal | yes | yes | yes | yes | yes |
| Example 14 | Centrifugal | yes | yes | yes | yes | yes |
| Example 15 | Centrifugal | yes | yes | yes | yes | yes |
| Example 16 | Centrifugal | yes | yes | yes | yes | yes |

*Feature (a): Tank body having a liquid passage port and a circulation port, with a return tube and extraction tube respectfully connected thereto.
**The materials of the filter, the tank body, the return tube and the extraction tube mentioned herein tends to mean the material on the liquid contacting surface of these components.

TABLE 2

| Example No. | Handling properties | Trace Metal | Online Wet Particles |
|---|---|---|---|
| Example 1 | Good | 5 | 5 |
| Comparative Example 1 | Poor | 1 | 1 |
| Comparative Example 2 | Good | 1 | 1 |
| Example 2 | Good | 2 | 2 |
| Example 3 | Good | 2 | 3 |
| Example 4 | Poor | 3 | 4 |
| Example 5 | Good | 4 | 3 |
| Example 6 | Good | 2 | 2 |
| Example 7 | Good | 4 | 3 |
| Example 8 | Good | 4 | 3 |
| Example 9 | Good | 2 | 3 |
| Example 10 | Good | 2 | 3 |
| Example 11 | Good | 4 | 3 |
| Example 12 | Good | 4 | 3 |

TABLE 2-continued

| Example No. | Handling properties | Trace Metal | Online Wet Particles |
|---|---|---|---|
| Example 13 | Good | 4 | 3 |
| Example 14 | Good | 3 | 3 |
| Example 15 | Good | 4 | 3 |
| Example 16 | Good | 5 | 3 |

From the evaluation results shown in Table 2, it can be seen that when the chemical liquid purification apparatus includes at least a liquid sending pump and a filtration device, then the obtained chemical liquid would have good handling properties, with the trace metal or the online wet particles at acceptable levels. More specifically, as shown in example 1, the filtration device has: two filters with pore size of less than 100 nm, and fulfills the requirement of R1>R2; the liquid sending pump is a centrifugal pump; the materials (liquid contacting surface) of the filter, the tank body, the return tube and the extraction tube are made of PTFE; the piping is electrolytic polished stainless steel; and the lorry type tank body is purged with nitrogen gas during purification. As such, high quality (low particle) chemical liquid can be obtained in example 1, whereby the chemical liquid has good handling properties and the trace metal and online wet particles are at optimal levels.

In comparison, as shown in comparative example 1, if the liquid sending pump is omitted from the purification apparatus, then the handling properties are poor, a significantly high amount of trace metals are observed (score of 1), and very poor hard particles and very poor stain defect for the online wet particles are obtained (score of 1). Similarly, as shown in comparative example 2, if the filtration device is omitted from the purification apparatus, then the handling properties are poor, a significantly high amount of trace metals are observed (score of 1), and very poor hard particles and very poor stain defect for the online wet particles are obtained (score of 1). The reason for the poor performance observed in comparative examples 1 and 2 is because a stable filtration flow rate cannot be obtained, and filtration performance cannot be performed stably.

Furthermore, as shown in examples 2-16, when some of the components other than the liquid sending pump and the filtration device are omitted from the purification apparatus, good handling properties may still be achieved, however, the trace metal and online wet particles are not at optimal levels.

For instance, referring to examples 2-3, when only one filter is used, the trace metal and online wet particles scores are not as good as that in example 1. Referring to example 4, when the tank body is not a lorry type tank, although the trace metal and online wet particles scores are at acceptable levels, these scores are not as good as that in example 1. Furthermore, in a non-lorry type apparatus of Example 4, since another filling/transferring step into the lorry package is required after purification, the chemical liquid may be subjected to contamination risks, resulting in poor handling properties. Referring to examples 5 and 13, when the material of both of the filters are not PTFE, although the trace metal and online wet particles scores are at acceptable levels, these scores are not as good as that in example 1. Referring to example 6, when two filter are used, if both of the filter pore size is greater than 100 nm, then a high amount of trace metals is observed (score of 2), and poor hard particles and poor stain defect for the online wet particles are obtained (score of 2). Referring to example 7, when a diaphragm pump is used instead of a centrifugal pump, although the trace metal and online wet particles scores are at acceptable levels, these scores are not as good as that in example 1. Referring to example 8, when the material of the tank body is not PTFE, although the trace metal and online wet particles scores are at acceptable levels, these scores are not as good as that in example 1.

Referring to example 9, when the piping is not electrolytic polished stainless steel, then a high amount of trace metals is observed (score of 2), and good hard particles and poor stain defect, or poor hard particles and good stain defect for the online wet particles are obtained (score of 3). Referring to example 10, when the material of the return tube and extraction tube is not PTFE, then a high amount of trace metals is observed (score of 2), and good hard particles and poor stain defect, or poor hard particles and good stain defect for the online wet particles are obtained (score of 3). Referring to example 11, when the filter pore size of the two filters do not fulfill the requirement of R1>R2, although the trace metal and online wet particles scores are at acceptable levels, these scores are not as good as that in example 1. Referring to example 12, when the tank body is not purged with nitrogen gas during purification, although the trace metal and online wet particles scores are at acceptable levels, these scores are not as good as that in example 1. Referring to example 14, when only one of the filter materials is PTFE, although the trace metal and online wet particles scores are at acceptable levels, these scores are not as good as that in example 1. Referring to examples 15-16, when a third filter made of material other than PTFE is used, although the trace metal and online wet particles scores are at acceptable levels, these scores are not as good as that in example 1.

According to the evaluation results above, the chemical liquid purification apparatus of the present disclosure is at least configured with a liquid sending pump and a filtration device located in between the liquid passage port and the circulation port. Therefore, high quality (low particle) chemical liquids can be obtained, while the manufacture throughput time and facility investigation costs are reduced.

Furthermore, the same tendency is obtained when the solvent used is selected from the group consisting of methanol, ethanol, 1-propanol, isopropanol, monomethyl ether, propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, 4-methyl-2-pentanol, and a combination thereof. Among them, better performance is obtained when cyclohexanone, PGMEA, butyl acetate, propylene glycol monomethyl ether acetate, isopropanol is used, and even better performance is obtained when cyclohexanone is used.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A chemical liquid purification apparatus, comprising:
a tank body having a liquid passage port and a circulation port communicated to a storage space inside the tank body, wherein the tank body is a movable type tank body, and a liquid contacting surface of the tank body is made of polytetrafluoroethylene;
a return tube having one end connected to the circulation port and another end extending to the storage space;

an extraction tube having one end connected to the liquid passage port and another end extending to a bottom of the storage space, wherein a liquid contacting surface of the return tube and a liquid contacting surface of the extraction tube are made of polytetrafluoroethylene;

a liquid sending pump and a filtration device located outside the tank body in between the liquid passage port and the circulation port, wherein the liquid sending pump is a centrifugal pump, and wherein the filtration device includes at least a first filter made of polytetrafluoroethylene and a second filter made of polytetrafluoroethylene, the first filter is located in between the second filter and the liquid passage port, and the second filter s located in between the first filter and the circulation port, the first filter and the second filter have pore sizes of 100 nm or less, wherein the pore size of the first filter is R1 and the pore size of the second filter is R2, and R1>R2; and a piping connecting the liquid sending pump and the filtration device to the liquid passage port and the circulation port, wherein a liquid contacting surface of the piping is electrolytic polished stainless steel further comprising a support and a wheel set mounted at the bottom of the tank body, respectively being close to a front end and a rear end of the tank body, and configured to collaboratively support the tank body on the ground.

2. The chemical liquid purification apparatus according to claim 1, wherein the tank body is a tank body of a lorry.

3. The chemical liquid purification apparatus according to claim 1, wherein a ratio of a length of the return tube to a height of the tank body is in a range of 1:10 to 2:10.

4. The chemical liquid purification apparatus according to claim 1, wherein the tank body further comprises a manhole and an air hole located on the top of the tank body.

5. A chemical liquid purification apparatus, comprising:

a tank body having a liquid passage port and a circulation port communicated to a storage space inside the tank body;

a return tube having one end connected to the circulation port and another end extending to the storage space;

an extraction tube having one end connected to the liquid passage port and another end extending to a bottom of the storage space, wherein a liquid contacting surface of the return tube and a liquid contacting surface of the extraction tube are made of polytetrafluoroethylene;

a liquid sending pump and a filtration device located outside the tank body in between the liquid passage port and the circulation port, wherein the filtration device includes at least a first filter, a second filter and an ion exchange filter, wherein the pore size of the first filter is R1 and the pore size of the second filter is R2, and R1>R2, and the first filter and the second filter are made of fluororesin; and a piping connecting the liquid sending pump and the filtration device to the liquid passage port and the circulation port, wherein a liquid contacting surface of the piping is electrolytic polished stainless steel further comprising a support and a wheel set mounted at the bottom of the tank body, respectively being close to a front end and a rear end of the tank body, and configured to collaboratively support the tank body on the ground.

\* \* \* \* \*